(12) United States Patent
Engelke et al.

(10) Patent No.: US 7,660,398 B2
(45) Date of Patent: Feb. 9, 2010

(54) CAPTIONED TELEPHONE SERVICE

(75) Inventors: Robert M. Engelke, Madison, WI (US); Kevin R. Colwell, Middleton, WI (US); Troy D. Vitek, Waunakee, WI (US)

(73) Assignee: Ultratec, Inc., Madison, WI (US)

( * ) Notice: Subject to any disclaimer, the term of this patent is extended or adjusted under 35 U.S.C. 154(b) by 714 days.

(21) Appl. No.: 11/061,682

(22) Filed: Feb. 18, 2005

(65) Prior Publication Data

US 2005/0226394 A1 Oct. 13, 2005

Related U.S. Application Data

(60) Provisional application No. 60/545,519, filed on Feb. 18, 2004.

(51) Int. Cl.
*H04M 11/00* (2006.01)

(52) U.S. Cl. ........................... 379/52; 379/93.07

(58) Field of Classification Search .................. 379/52, 379/93.15, 93.07
See application file for complete search history.

(56) References Cited

U.S. PATENT DOCUMENTS

| | | | |
|---|---|---|---|
| 3,372,246 A | 3/1968 | Knuepfer |
| 3,507,997 A | 4/1970 | Weitbrecht |
| 3,515,814 A | 6/1970 | Morgan |
| 3,585,303 A | 6/1971 | Chieffo |
| 3,598,920 A | 8/1971 | Fischer |
| 3,800,089 A | 3/1974 | Reddick |
| 3,896,267 A | 7/1975 | Sachs |
| 3,959,607 A | 5/1976 | Vargo |
| 3,976,995 A | 8/1976 | Sebestyen |
| 4,012,599 A | 3/1977 | Meyer |
| 4,037,067 A | 7/1977 | Solomovitz |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel et al. |
| 4,191,854 A | 3/1980 | Coles |
| 4,201,887 A | 5/1980 | Burns |

(Continued)

FOREIGN PATENT DOCUMENTS

DE 2647097 4/1978

(Continued)

OTHER PUBLICATIONS

Gopalakrishnan et al., Effective Set-Up For Performing Phone Conversations By The Hearing Impaired, IBM Technical Disclosure Bulletin, www.delphion.com, 4 pages.

(Continued)

*Primary Examiner*—Stella L Woo
(74) *Attorney, Agent, or Firm*—Quarles & Brady LLP

(57) ABSTRACT

Captioned telephone are devices intended to provide text captions to persons needing assistance with telephone communications. Captioned telephones provide text by using the services of a relay interposed between the assisted user and the hearing user, the relay providing the captioning for the assisted user. While captioned telephone service can be delivered over a single telephone line, if the assisted user has two telephone lines available for the captioning service, additional features and advantages are possible in the delivery of captioned telephone service to the user.

13 Claims, 2 Drawing Sheets

U.S. PATENT DOCUMENTS

| | | | |
|---|---|---|---|
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes et al. |
| 4,307,266 A | 12/1981 | Messina |
| 4,354,252 A | 10/1982 | Lamb et al. |
| 4,415,065 A | 11/1983 | Sandstedt |
| 4,426,555 A | 1/1984 | Underkoffler |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin et al. |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan et al. |
| 4,713,808 A | 12/1987 | Gaskill et al. |
| 4,754,474 A | 6/1988 | Feinson |
| D296,894 S | 7/1988 | Chen |
| 4,777,469 A | 10/1988 | Engelke et al. |
| 4,799,254 A | 1/1989 | Dayton et al. |
| 4,817,135 A | 3/1989 | Winebaum |
| 4,839,919 A | 6/1989 | Borges et al. |
| 4,849,750 A | 7/1989 | Andros et al. |
| 4,868,860 A | 9/1989 | Andros et al. |
| 4,897,868 A | 1/1990 | Engelke et al. |
| D306,727 S | 3/1990 | Fritzsche |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| D322,785 S | 12/1991 | Wu |
| 5,081,673 A | 1/1992 | Engelke et al. |
| 5,086,453 A | 2/1992 | Senoo et al. |
| 5,091,906 A | 2/1992 | Reed et al. |
| 5,095,307 A | 3/1992 | Shimura et al. |
| 5,099,507 A | 3/1992 | Mukai et al. |
| 5,121,421 A | 6/1992 | Alheim |
| 5,128,980 A | 7/1992 | Choi |
| 5,134,633 A | 7/1992 | Werner |
| 5,163,081 A | 11/1992 | Wycherley et al. |
| 5,192,947 A | 3/1993 | Neustein |
| 5,210,689 A | 5/1993 | Baker et al. |
| 5,214,428 A | 5/1993 | Allen |
| 5,216,702 A | 6/1993 | Ramsden |
| 5,249,220 A | 9/1993 | Moskowitz et al. |
| 5,280,516 A | 1/1994 | Jang |
| 5,289,523 A | 2/1994 | Vasile et al. |
| 5,307,399 A | 4/1994 | Dai et al. |
| 5,311,516 A | 5/1994 | Kuznicki et al. |
| 5,325,417 A | 6/1994 | Engelke et al. |
| 5,327,479 A | 7/1994 | Engelke et al. |
| 5,339,358 A | 8/1994 | Danish et al. |
| 5,343,519 A | 8/1994 | Feldman |
| 5,351,288 A | 9/1994 | Engelke et al. |
| D351,185 S | 10/1994 | Matsuda et al. |
| 5,359,651 A | 10/1994 | Draganoff |
| 5,377,263 A | 12/1994 | Bazemore et al. |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,432,837 A | 7/1995 | Engelke et al. |
| 5,459,458 A | 10/1995 | Richardson et al. |
| D364,865 S | 12/1995 | Engelke et al. |
| 5,475,733 A | 12/1995 | Eisdorfer et al. |
| 5,487,671 A | 1/1996 | Shpiro et al. |
| 5,503,560 A | 4/1996 | Stentiford |
| 5,517,548 A | 5/1996 | Engelke et al. |
| 5,522,089 A | 5/1996 | Kikinis et al. |
| 5,574,784 A | 11/1996 | LaPadula et al. |
| 5,581,593 A | 12/1996 | Engelke et al. |
| 5,604,786 A | 2/1997 | Engelke et al. |
| D379,181 S | 5/1997 | Sawano et al. |
| 5,680,443 A | 10/1997 | Kasday et al. |
| 5,701,338 A | 12/1997 | Leyen et al. |
| 5,710,806 A | 1/1998 | Lee et al. |
| 5,712,901 A | 1/1998 | Meermans |
| 5,724,405 A | 3/1998 | Engelke et al. |
| 5,766,015 A | 6/1998 | Shpiro |
| 5,787,148 A | 7/1998 | August |
| 5,799,273 A | 8/1998 | Mitchell et al. |
| 5,809,112 A | 9/1998 | Ryan |
| 5,809,425 A | 9/1998 | Colwell et al. |
| 5,826,102 A | 10/1998 | Escobar et al. |
| 5,850,627 A | 12/1998 | Gould et al. |
| D405,793 S | 2/1999 | Engelke et al. |
| 5,870,709 A | 2/1999 | Bernstein |
| 5,905,476 A | 5/1999 | McLaughlin et al. |
| 5,909,482 A | 6/1999 | Engelke |
| 5,974,116 A | 10/1999 | Engelke et al. |
| 5,978,654 A | 11/1999 | Colwell et al. |
| 5,991,723 A | 11/1999 | Duffin |
| 5,995,590 A | 11/1999 | Brunet et al. |
| 6,075,534 A | 6/2000 | VanBuskirk et al. |
| 6,075,841 A | 6/2000 | Engelke et al. |
| 6,075,842 A | 6/2000 | Engelke et al. |
| 6,175,819 B1 | 1/2001 | Van Alstine |
| 6,188,429 B1 | 2/2001 | Martin et al. |
| 6,233,314 B1 | 5/2001 | Engelke |
| 6,307,921 B1 | 10/2001 | Engelke et al. |
| 6,314,396 B1 | 11/2001 | Monkowski |
| 6,324,507 B1 | 11/2001 | Lewis et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,549,611 B2 | 4/2003 | Engelke et al. |
| 6,567,503 B2 | 5/2003 | Engelke et al. |
| 6,594,346 B2 | 7/2003 | Engelke |
| 6,603,835 B2 * | 8/2003 | Engelke et al. ................ 379/52 |
| 6,748,053 B2 | 6/2004 | Engelke et al. |
| 6,763,089 B2 | 7/2004 | Feigenbaum |
| 6,885,731 B2 | 4/2005 | Engelke et al. |
| 6,914,964 B1 * | 7/2005 | Levine ........................ 379/52 |
| 6,934,366 B2 | 8/2005 | Engelke et al. |
| 7,003,082 B2 | 2/2006 | Engelke et al. |
| 7,006,604 B2 | 2/2006 | Engelke |
| 7,142,642 B2 | 11/2006 | McClelland et al. |
| 7,142,643 B2 | 11/2006 | Brooksby |
| 7,164,753 B2 | 1/2007 | Engelke et al. |
| 7,315,612 B2 | 1/2008 | McClelland |
| 2002/0122550 A1 * | 9/2002 | Noplock ................ 379/355.01 |
| 2004/0083105 A1 | 4/2004 | Jaroke |
| 2005/0226398 A1 | 10/2005 | Bojeun |
| 2006/0140354 A1 | 6/2006 | Engelke |
| 2007/0036282 A1 | 2/2007 | Engelke et al. |
| 2008/0152093 A1 | 6/2008 | Engleke et al. |

| | | | |
|---|---|---|---|
| 2008/0187108 A1 | 8/2008 | Engelke et al. | |

FOREIGN PATENT DOCUMENTS

| | | |
|---|---|---|
| DE | 2749923 | 5/1979 |
| DE | 3410619 | 10/1985 |
| DE | 3632233 | 4/1988 |
| EP | 0029246 | 5/1981 |
| EP | 1 330 046 A1 | 7/2003 |
| EP | 1330046 | 7/2003 |
| FR | 2403697 | 4/1979 |
| FR | 2432805 | 2/1980 |
| FR | 2538978 | 7/1984 |
| GB | 2183880 | 6/1987 |
| GB | 2335109 | 9/1999 |
| GB | 2339363 | 1/2000 |
| JP | 55-044283 | 3/1980 |
| JP | 57-055649 | 4/1982 |
| JP | 58-134568 | 8/1983 |
| JP | 60-259058 | 12/1985 |
| JP | 63-198466 | 8/1988 |
| WO | PCT/US93/04760 | 11/1993 |
| WO | PCT/US9500015 | 7/1995 |

OTHER PUBLICATIONS

PCT Written Opinion, PCT/US2005/005149, Ultratech, Inc. et al.
Radio Electronics, Mar. 1976, pp. 51-58, "ASCII to Baudot" Smith, Roger L.
R.J. Cooper, "Break feature for half-duplex modem", IBM Technical Disclosure Bulletin, vol. 17, No. 8, pp. 2386-2387 Jan. 1975.
Gopalakrishnan, "Effective Set-up for Performing Phone Conversations by the Hearing Impaired", IBM Technical Disclosure Bulletin, pp. 423-426, (Dec. 1991).
Moskowitz, J., "Telocator Alphanumeric Protocol", Version 1.8, 1997.

* cited by examiner

CAPTIONED TELEPHONE SERVICE

CROSS-REFERENCE TO RELATED APPLICATION

This application claims priority from U.S. provisional patent application Ser. No. 60/545,519 filed Feb. 18, 2004.

STATEMENT REGARDING FEDERALLY SPONSORED RESEARCH OR DEVELOPMENT

Not applicable.

BACKGROUND OF THE INVENTION

Modern telecommunication systems include facilities to permit use of telecommunication systems by those who are deaf or hard of hearing. The best known form of such communication makes use of devices known as telecommunication devices for the deaf (TDD), also known as text telephones (TTY). TTY communication is widely used between deaf people. Hearing users communicate with deaf users who are users of TDD devices through so-called "relays." A relay is a telecommunication intermediary service, funded by telephone communication surcharges, which is intended to permit deaf or hard of hearing people to utilize the normal telephone network. At a relay, an operator referred to as a call assistant intermediates between a deaf user and a hearing person by communicating with the deaf person using a TDD and communicating with the hearing person by voice over a normal telephone line.

Previous technology has enabled the relay system to be used to provide a form of enhanced telephone communication for people who are not deaf, but are hard of hearing. This approach to telecommunications is exemplified by U.S. Pat. Nos. 6,307,921 and 6,075,842, the disclosure of which is incorporated by reference. These patents, entitled "Text Enhanced Telephony," referred to a system that provides captioned telephone service, a service currently marketed under the service mark Captel by Ultratec, Inc. and its licensees. A captioned telephone, or telephone enabled to do text enhanced telephony, is capable of providing a text message to a user of the words which are transmitted to that user over a conventional telephone line. The captioned telephone user receives normal voice from the party on the other end of the line, as well as a text transcription of the words spoken by the other party, so that the user may refer to the text for missed words in the conversation. This capability is made possible by automation in the relay which permits text or captioning to be delivered nearly simultaneously with voice. In addition, the telephone station of the assisted user is specially configured to facilitate the set up of captioned telephone calls.

In its original conception, the text assisted telephone system was designed to be deliverable to and operated by a user over a single telephone line to the user. As the costs of telephone service drops, it is now apparent that many users of captioned telephone service may elect to use two telephone lines to take full advantage of the opportunity for improved service that comes from text enhanced telephone. The concept of using two telephone lines to provide captioned telephone service in general to an assisted user is disclosed in U.S. Pat. No. 6,603,835, the disclosure of which is incorporated herein by reference.

BRIEF SUMMARY OF THE INVENTION

The present invention is summarized in a method of operating a captioned telephone call in which an assisted user is connected by through a captioned telephone device which is connected both to one telephone line to a remote user and a second telephone line to a relay providing captioning for the conversation. The method includes the steps of when the assisted user initiates a call by dialing a telephone number on the first telephone line, the captioned telephone device storing the telephone number without dialing immediately on the first telephone line; the captioned telephone device initiating a call on the second telephone line to the relay to initiate captioning service set up; and the captioned telephone device then dialing the stored telephone number on the first telephone line.

It is an object of the present invention to provide a captioned telephone service that is as automatic as it can be made in terms of services and options to the assisted user.

It is another object of the present invention to make a captioned telephone service that, to the user, seems as close as possible to conventional telephone service for fully hearing users.

It is another object of the present invention to define a captioned telephone system in which the relay call assistant does not have to hear the voice of the assisted user.

Other objects, advantages and features of the present invention will become apparent from the following specification.

DETAILED DESCRIPTION OF THE INVENTION

Figure 1:
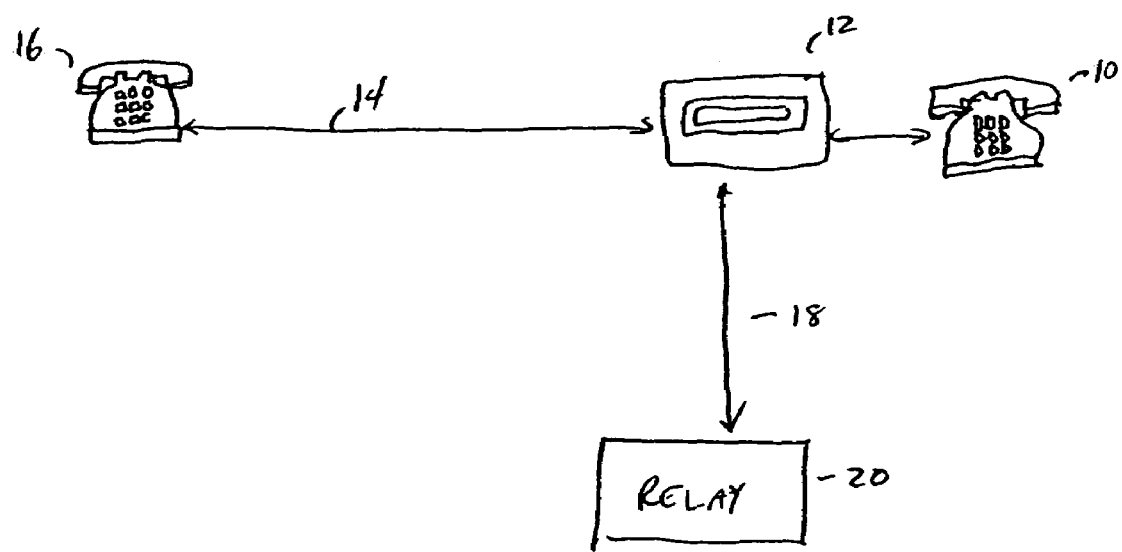
FIG. 1 is a schematic view of the arrangement of the parties in a captioned telephone call system as described here.

Shown in FIG. 1 is a schematic view of the arrangement for a generalized two line captioned telephone service. An assisted user is positioned to use a telephone 10. The user telephone is connected to a captioned telephone device 12, which is interposed between the telephone 10 and a first telephone line 14. As an alternative, the captioned telephone device 12 is preferably built into the same physical case as the telephone 10, but these are shown in separate boxes in FIG. 1 for purposed of clarity of illustration. The first telephone line 14 connects to a remote telephone 16, which is the station of the caller or person to whom the assisted user wishes to speak. The captioned telephone device is also connected to a second telephone line 18, which is connected at its other end to a relay, indicated at 20. The relay 20 is preferably a relay of the type described in U.S. Pat. No. 6,233,314, among others, and currently commercially available under the name CapTel™ relay, from CapTel, Inc.

In its general operation, the person at the remote telephone 16 would converse normally with the assisted user at the telephone 10. At the captioned telephone device 12, the voice of the remote user is passed along the second telephone line 18 to the relay 20. At the relay 20, the voice carrying the spoken words of the remote user is converted into a text or digital massage stream that is passed back to the captioned telephone device 12 over the same telephone line 18. The captioned telephone device 12 displays the text of the digital message stream received from the relay 20, so that the assisted user can read the words spoken by the remote user. The captioned telephone device 12 is constructed to not pass voice or digital signals from the relay onto the first telephone line, so that the digital communication tones from the relay do not distract or bother the users. If the assisted user can hear and understand the words spoken by the remote user, the assisted user can respond normally. If the assisted user has difficulty in hearing or understanding any words spoken by the remote user, those words are displayed for the assisted user by the captioned telephone device so that the assisted user can read the words. Thus the service is unobtrusive and available as needed to help the assisted user.

Figure 2:
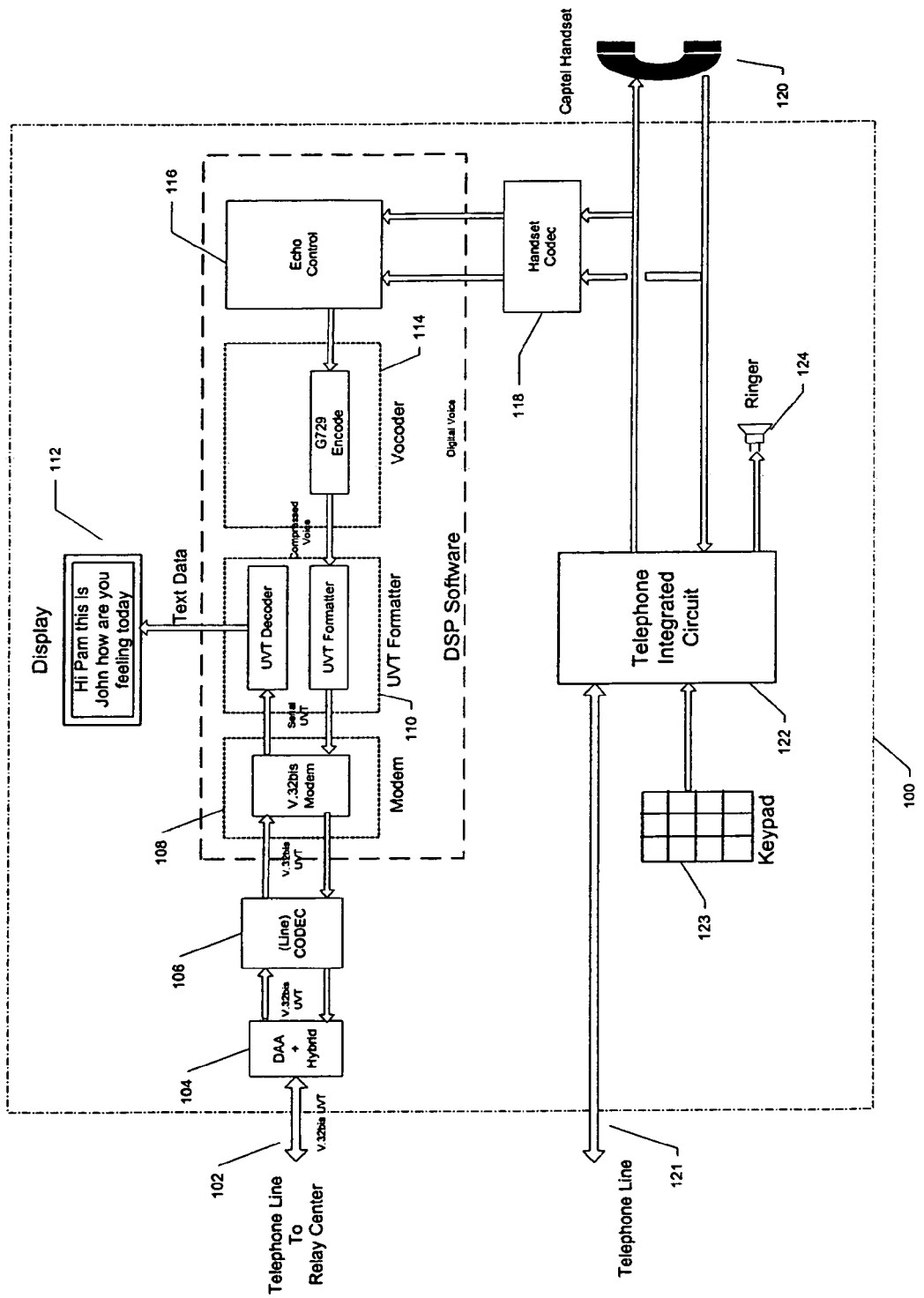
FIG. 2 is a schematic diagram or a combined telephone and captioned telephone device.

In the preferred embodiment of the captioned telephone device 12, the captioned telephone device 12 and the telephone 10 are combined in a single device. Shown in FIG. 2 is a captioned telephone device 100 which embodies that combination. This device is also intended to support a communication, command and signaling protocol known as UVT to facilitate captioned call, as is described in more detail in U.S. Pat. No. 6,504,910, which is hereby incorporated by reference. In FIG. 2 the interior components of the captioned telephone device 100 are illustrated in block diagrams indicating the digital logic components from which the device may be constructed. It is preferred, however, that the components within the dotted lines in FIG. 2, labeled as DSP software, actually be implemented in the form of a software routine operating a digital signal processing integrated circuit to perform the functions of the illustrated blocks. In the captioned telephone device 100, the telephonic connection to the relay, i.e. the connection to the second telephone line 18, is indicated at 102. The input telephonic signal connects to a DAA and hybrid 104 and then to a codec 106 to digitize input signals. Following the codec 106 is a modem 108, the output of which connects to a UVT formatter 110. The UVT formatter 110 formats the digitized voice signals from the first telephone line for transmission to the relay service and to decode the digital text signals received. The digitized text signals are transferred from the UVT formatter 110 to a visually readable display 112 on which the text can be displayed for the assisted user. Voice signals from the first telephone line 14, indicated here as 121, are converted to digital signals by a codec 118. An echo control circuit 116 is used to remove the voice of the assisted user at a handset 120 from the voices of the other party. The output of the echo control 116 is sent to a vocoder 114 for compression, in this case, using G.729 protocols. The voice is passed to the UVT formatter 110 and on to a modem 108 for transmission to the relay center over the telephone line 102. In summary, the assisted station passes the voice from the first telephone line 121 to the speaker in the handset for the assisted user and also compresses the voice for transmission to the relay service over the telephone line 102. At the same time, it decodes the digital text stream and presents the text stream as a visual text message to the user on the display 112. The assisted user thus receives both the voice of the hearing user from the first telephone line and is provided a text display of the words spoken by the hearing user from the digital test sent over the second telephone line.

In general, the specification below describes only the differences in the operation of an captioned telephone service between that logically configured as shown in FIG. 1 and a similar captioned telephone device operating an a single telephone line. However, it should be understood that the physical embodiment of the devices and the telephone lines is subject to much variation. For example, while plain, unfeatured, land-line "plain old telephone services" are illustrated in FIG. 1, the telephone lines or connections themselves may be any of the more modern wired or wireless telephones available today. The captioned telephone device is, for example, preferably built in the same device as the telephone 12, as illustrated in FIG. 2. Similarly, the telephone lines 14 and 18 can be simple land-line two-wire telephone lines, but they could also be any other form of modern telephone interconnection, including cellular connections, PCS connections, or even data connections such as internet protocol (IP) connected across the internet or other data connection service. While two single telephone connections can be used for this function it is also understood that a single IP physical connection can serve as the two separate connections. Thus the term telephone line or telephone connection as used in this document is intended to be used to describe a voice capable interconnection between two remote telephone devices rather than being restricted to a physical pair of wires. In any event, as will be seen from the following description, a number of features of addition functionality are possible using a two-line captioned telephone connection that have not been previously contemplated. Several of such features are discussed and the features can be implemented as a group or individually.

Dial Delay

Assume that the party initiating the call session is the assisted user at the telephone 10. Assume as well that the assisted user wants the default configuration to be that his or her calls are a text assisted, or are captioned. The user picks up the handset of the telephone 10 and dials as normal the telephone number of the remote user. However, if the remote user was dialed immediately, there is a chance that the captioning service would not be ready to go at the time the remote user answers his or her telephone 16. So the captioned telephone device 12 at the station of the assisted user is programmed to intercept the dialing of the remote user and to instead first dial the relay 20 on telephone line 18. Typically, in the simplest embodiment, the captioned telephone device could simply store DTMF tones for the number dialed by the assisted user. When the relay 20 is engaged and ready to function, a command is sent over the telephone line 18 to the captioned telephone device 12 to initiate the call to the remote user. The captioned telephone device 12 then calls the telephone 14 of the remote user to initiate the call, as by placing the DTMF tones for the on the first telephone line 12 to make the call.

Using this concept of intercepting and storing the number called by the assisted user, the captioning function provided by the relay 20 is available from the start of the call. If, for example, the call does not go through properly, and a message is received from the telephone network, such as "all circuits are busy now, please try again later," that message can be transmitted in text to the assisted user. If the assisted is so hearing impaired that the ringing or answering of the remote telephone cannot be understood, text messages from the relay can supply the needed information.

Again while the simplest embodiment of this feature is the interception of the DTMF tones, and the storage of those tones for later uses, the functional equivalent of that technique for other forms of telephone interconnection are also envisioned. If, for example, the telephone connection is actually through IP access over the internet, the captioned telephone device 12 could store the uniform resource address (URL) for the remote user, connect to the relay 20 by internet access or conventional telephone connection, and then implement the connection to the remote user to complete the call. Another alternative as to the implementation of this feature is to use a fixed time delay for dialing the remote station instead of waiting for an acknowledgement from the-relay. A fixed time delay of a few seconds would normally suffice for the relay to be connected and up and running.

One safety detail is required to properly implement this feature. If the number dialed by the assisted user is "911" or other emergency assistance number, then the dial should not be delayed at all, and the dialing information should be immediately presented to the telephone network. Emergency service facilities, such as the various 911 services in the United States, are normally equipped with the capability to receive and communicate with hearing impaired callers directly, without the need for an intermediate relay. In addition, it is desirable that the response time for receipt and handling of the emergency services call not be impacted by other factors such as a potential busy time for service usage at the relay. Hence it is preferred that the captioned telephone device 12, whether it is a separate box or a part of the assisted user's telephone, scan the numbers dialed by the assisted user and immediately pass along any call to the local emergency services number regardless of the user's preferences about relay assistance in normal calls. In addition, when dialing 9-1-1 is detected, the captioned telephone device 12 can be equipped to have a second DTMF number or other method of connecting to the relay 20 which has priority over other calls such that the user dialing 9-1-1 is routed to the relay 20 and given captioning service in the minimum possible time delay.

Line Testing

A feature that modern telephone equipment makes possible is line testing to see if a telephone line is "on-hook" (meaning unused) or "off-hook" (meaning that the line is in use) This feature or capability tests the telephone line to which it is connected, and returns a signal of in use, not in use, or ringing. For two-line captioned telephone service, the ability to test line conditions permits condition responsive actuation of variations of the captioned telephone service.

For example, assume that the telephone 10 of the assisted user is not in use, but set up to answer and automatically initiate captioning by a call on the second telephone line 18 to the relay 20. Then when a call is received by the telephone 10, it can test the condition of the second telephone line 18 before responding. If the telephone line 18 is available, the assisted users' station can initiate the call to the relay to secure captioning service even before answering the incoming call on the first telephone line. If the second telephone line is busy, then station can inform the user and give the assisted user the option to capture the number of the caller using Caller-ID, and then call that same party right back using single line captioned service using only the first telephone line. The assisted user could also wait until the second line clears and then initiate a two-line captioned call.

Automated Mode Choice

As describe above, the captioned telephone device can sense the status of the telephone lines as to whether they are in use of not. In most cases, the device will use the same line, here telephone line 14, to connect to the remote caller, and a second telephone line 18 to connect to the relay. In this configuration, the assisted user would generally give out the telephone number of the first telephone line 14 as their telephone number. If an incoming call is received by the station of the assisted user, while the telephone is ringing, the captioned telephone device 12 checks the status of the second telephone line 18. If the second telephone line 18 is available, the normal implementation of two-line captioning can proceed. If the second telephone line is in use, the device then displays for the assisted user a message such as "Line 2 is in use, no captions available," or other warning about the status of captioning. The assisted user can then decide if he or she wishes to answer the line and conduct the telephone call without captioning. Since the captioned telephone device preferably includes built-in Caller ID functionality, the assisted user can evaluate the availability for 2-line captioning service before picking up the telephone to answer the call.

The same information is, of course, available when the assisted user is the person doing the dialing. The assisted user dials a number, with the captioned telephone device set up to normally invoke captioning from the relay over the second telephone line 18. The captioned telephone device 12 senses, however, that the second line 18 is busy, and therefore provides a message to the assisted user such as "Line 2 not available, Use 1 line captioning?" If the assisted user elects to proceed with 1-line captioning, as by pressing a key on the captioned telephone device, the captioned telephone device would first call the relay 20 and pass to the relay command information so as to set the call up as a single line captioned call. In that mode, the relay is interposed between the assisted and remote callers, as described in U.S. Pat. No. 5,724,405. If the assisted user does not wish to proceed with single line captioning, the assisted user can simply hang up and try again later when the second line might be available.

Automated Line Selection

As described above, the captioned telephone device can detect the status of the two telephone lines, and use that information in the set up of the captioned telephone call. The assisted user will normally have the first telephone line 14 set up to be the primary telephone line. In this configuration, the first line 14 would normally be the line on which the assisted user places and receives calls. However, the captioned telephone device 12 will also detect an incoming ring on the second telephone line 18 and signal to the assisted user that an incoming call is being detected. Such a signal may need to be a visual signal (such as displaying a message such as "Ring on Line 2" for users who cannot hear at all, while for a hearing user the signal for an incoming call on the second line can be a ringing tone different from that tone used with the first telephone line 14. If the captioned telephone device has been configured to set up a 2-line captioned telephone call, the device will then dial the relay 20 over the first telephone line and reverse the usual configuration.

Automated Installation

As mentioned, the captioned telephone device 12 is provided with the ability to sense the status of the two telephone lines to which it is connected. This permits automated set up of the device during installation. The user simply connects the telephone jacks to the standard ports provided on the captioned telephone device. The software in the device will detect that a telephone line is connected and automatically configure the software to use that telephone line as the first telephone line. If only one line is connected to the device, it still automatically set itself up to support one-line captioning for any telephone calls made. If the user has two telephone lines available, and the lines are connected to the captioned telephone device, it will detect that and will automatically configure itself to be able to support two-line captioning service. Used in this way, it is not mandatory that the assisted user actually designate either of the two telephone lines as their first or second line. The captioned telephone device will automatically configure itself for the telephone line or lines available and may the best adaptation that it can to any incoming or outgoing call. The captioned telephone device does have the alternative to designate one of the lines as the primary line, if that is needed for any reason.

Dial on Ring

When the assisted user receives a call using the captioned telephone service, the user answers the telephone just as they normally would, by picking up the handset or actuating the speakerphone, if equipped with one. When the start of an incoming call is detected by the captioned telephone device, it then checks the status of the control buttons on the face of the device and, assuming the captioning is selected, the captioned telephone device immediately dials the number of the relay. Normally it will take anywhere from a few seconds to tens of seconds before the captioning service is set up though the relay, depending on how busy the relay is at that moment. In most cases, the captioning service can be configured in ten to fifteen seconds. Obviously, by initiating the interconnection to the relay before the assisted user even picks up the telephone, the time required to begin captioning the call when it is answered is decreased. Note that since the largest cost at the relay is the call assistant, the relay would not assign a call assistant to the call until both parties have picked up their phones and are on the line. In that way, the cost of attention by a call assistant to the call is avoided if the assisted user does not actually answer the call.

Other strategies can be used to decrease the time for connection and set up. If an ISDN line is used for the second telephone line 18, the speed is increased since ISDN dialing is much faster than traditional DTMF dialing. However, since ISDN service is more expensive than traditional plain residential telephone service, other options may be more commercial acceptable to consumers. The captioning device can use Internet Protocol (IP) signaling to communicate with the relay service center. This would allow direct digital or internet connections for the delivery of the captions, i.e. the logical second telephone line 18 would actually be an IP connection. Since broadband connection to the internet, wired and unwired, is becoming increasingly common, this alternative will be a preferred choice for many consumers.

End of Call

Another method for reducing set up time is to briefly hold the connection to the relay, established over the second telephone line, after the assisted user ends the call on the first telephone line 14. This is to provide for the possibility that the caller is about to make another call. If the assisted user is about to make another call, the fact that the connection to the relay has been maintained shortens the time necessary to set up the second call. When the assisted user begins the second call, the relay is already connected and captioning can begin immediately. The holding period should be brief, i.e. 2 to 10 seconds. When the hold timer expires, the captioned telephone device 12 sends a UVT message to the relay indicating that a disconnect is in progress, and it hangs up on the telephone line to the relay. The receipt of the UVT disconnect message also signal to the captioning service that the encounter is finished for the creation of a billing record of the call.

Echo Cancellation

For single line captioned telephone service, echo cancellation is used in the equipment of the relay for the captioned telephone service for two reasons. The first reason is the captioning system uses digitized and compressed audio to transmit voice and the delays inherent in this process would cause echo back to the user, were it not for the fact that the echo is not suppressed by the software. The second reason is to remove or cancel the voice of the assisted user from the audio received from the hearing party or the remote user. This is done so that the call assistant at the relay only hears the voice of the remote user that is to be captioned and is not confused by the voice of the assisted user.

When the captioning service is provided using two lines, echo cancellation is still needed, but the arrangement of the echo cancellation is significantly different. The echo cancellation now is located in the captioned telephone device at the location of the assisted user. The echo cancellation circuitry or function acts to separate the local voice of the assisted user from any other voices on the first telephone line 14 as presented to the call assistant. In the 2-line arrangement, this echo cancellation at the captioned telephone device provides the same benefit to the call assistant at the relay. The echo cancellation is located between the first telephone lines 14 and the handset microphone of the assisted user, so that the second telephone line 18 does not transmit to the relay any of the voice of the assisted user at telephone 10 to the relay. Thus the call assistant at the relay 20 is not exposed to the voice of the assisted user. This makes the job of the call assistant easier, since the call assistant captions the voice he or she hears.

The arrangement provides a subsidiary benefit in that it permits other members of the household to also participate in the call, by picking up an extension telephone and joining in the conversation. The voice or voices of the other people on the line are also sent to the relay for captioning. Only the voice of the assisted user, at the station of the captioned telephone device 12, is subjected to the echo cancellation. So the assisted user also gains the benefit of captioning of the other voices in the conversation. For single line captioning service, participation by other members of the household is normally not possible because the telephone communication to the house is in the form of a data stream carrying voice and text and is not a voice connection.

Billing Information Transmittal

For traditional TTY relay calls and for single-line captioning service calls, the relay uses the automatic number identification (ANI), or calling party number (CPN), of the assisted user and the dialed number of the remote user to determine who will be billed for the relay service performed. In the U.S., and some other countries, relay service is usually paid for by third party payer, funded by governmental mandate to provide telephone communication for the hearing impaired at the same cost as that available to the hearing. Typically in the U.S., calls that are dialed back to the same state as the originating caller (intrastate calls) are paid for by the state of the two parties to the conversation. Note that the relay may or may not be in the state in which the two parties connect for a conversation. The cost of the relay services for calls that cross a state boundary (interstate calls) are paid for by the National Exchange Carriers Association (NECA). NECA maintains a system of sharing costs and revenue for interstate telephone traffic that crosses state regulatory boundaries. The state agencies and NECA share the costs for toll free calls by an assisted user.

For two-line captioning service, the assisted user dials the other party directly. Hence, the relay is no longer in the middle of the call, between the parties. Therefore, it is not inherently apparent to the relay whether the call is interstate or intrastate. So the captioned telephone device is programmed to keep a record of the telephone number dialed by the assisted user and to report this number to the relay as a part of the set up of the captioning service for the call. A UVT command is used to send the dialing information to the relay for capture and association with the billing records for the call. This information transmission allows the relay service providing the captioning to determine the appropriate billing type for calls dialed by the assisted user. Similarly, if caller ID information is received and captured as a part of an incoming call, the information can also be transmitted to the relay in a similar format to inform the relay of the category of the call.

Call Answering Service

With two-line captioned telephone service, it is readily possible to add automated message answering service as an added feature. When one of the telephone lines rings with an incoming call, the software of the captioned telephone device, configured for automatic answering, waits for a predetermined number of rings and then answers the line. The captioned telephone device meanwhile connects to the relay over the other telephone line. The captioned telephone device then plays a pre-recorded message typical of telephone answering machines for the benefit of the caller. The calling party responds by leaving a voice message, which is transmitted to the captioning relay 20 for transcription into a text message. The captioned telephone device can also capture the voice or the telephone number of the calling party. The transcription of the message is transmitted by the relay to the captioned telephone device and is stored as well as a text message. When the assisted user returns, the text message is stored in memory of the captioned telephone device 12 and the voice message and/or number of the calling party can be stored as well.

When the assisted user returns, he or she lifts the handset of the telephone and presses a button on the captioned telephone device (or the combined device if the telephone is a part of the device). The captioned telephone device is programmed to display the text message on its display and, if desired, play back the voice message and/or telephone number of the calling party. The message storage, either voice or text or both, could also take place at the relay, and if this alternative is implemented, when the user returns and asks for messages, the relay would be called and the-stored-message downloaded. Note that the call assistant is not required for this message playback service and hence the cost would not be large.

Selection of Service by Call Type

In its normal mode of operation, the captioned telephone device automatically dials to the captioning relay 20, using a pre-configured telephone number (or IP address) for the relay. The assisted user normally will not need to know or to dial the relay number to control this function. However, it is a useful variant that the captioning device be configured to dial different numbers depending on the type and/or the number that the assisted user dials. For example, as stated earlier, if the assisted user dials an emergency assistance number, such as 911, the software for the captioned telephone device can be programmed to dial a specific priority access number into the emergency response system. Other specific functions or calls that use this feature include captioning in other languages, retrieving messages from the captioned relay service, installing updates to the software for the captioned telephone device, and 900 calls. 900 calls are calls which authorize additional costs to the caller for a service offered by the 900 number and therefor 900 calls cost more than normal telephone calls. As a result, many telephone system users elect to disable their telephones from calling 900 numbers.

Normally the captioned telephone user will access the captioning relay by means of toll-free number (800 numbers in the U.S.). If the assisted call requests the relay to dial a 900 number, the 900 number block at the station of the user is avoided. Normally, an outside service, such as the relay, cannot determine if 900 number access is blocked for the user's telephone. To avoid this issue, the captioned telephone device could test the telephone numbers it handles, and be programmed to not pass along to the relay any 900 or other objectionable numbers.

We claim:

1. A method of operating a captioned telephone call in which an assisted user is connected by a captioned telephone device which is connected both to one telephone line to a remote user and a second telephone line to a relay providing captioning for a conversation, the method comprising the steps of when the assisted user initiates a call by dialing a telephone number on a first telephone line, the captioned telephone device storing the telephone number without dialing immediately on the first telephone line;

the captioned telephone device initiating a call on the second telephone line to the relay to initiate captioning service set up, and thereafter passing spoken words received on the first telephone line to the second telephone line; and the captioned telephone device then dialing the stored telephone number on the first telephone line to initiate a spoken conversation; and the captioning service then providing captioning to the captioned telephone device of the spoken words transmitted on the second telephone line.

2. A method as claimed in claim 1 wherein the telephone lines are each a telephonic connection selected from the group consisting of a twisted pair telephone land line, a cellular telephone link, a PCS link, and an internet protocol (IP) connection.

3. A method as claimed in claim 1 wherein the captioned telephone device and a telephone of the assisted unit are built into a single device.

4. A method as claimed in claim 1 wherein the captioned telephone device examines the number dialed by the user and immediately dials the number dialed by the assisted user if the assisted user has dialed an emergency services number.

5. A method of operating a captioned telephone call in which an assisted user is connected by a captioned telephone device which is connected both to one telephone line to a remote user and a second telephone line to a relay providing captioning for a conversation, the method comprising the steps of the captioned telephone device monitoring the status of both of the telephone lines;

if a call is received by the captioned telephone device, and the other telephone line is not in use, the captioned telephone device setting up the call as a two-line captioned telephone call; and if a call is received by the captioned telephone device, and the other telephone line is in use, the captioned telephone device setting up the call as a single-line captioned telephone call.

6. A method of operating a captioned telephone call in which an assisted user is connected by a captioned telephone device which is connected both to one telephone line to a remote user and a second telephone line to a relay providing captioning for a conversation, the method comprising the steps of when an incoming call is initiated on the first telephone line, the captioned telephone device detecting the incoming call and immediately and automatically calling the relay on the second telephone line so that the captioning of the telephone call by the relay can commence as soon as possible.

7. A method as claimed in claim 6 wherein each of the telephone lines is a telephonic connection selected from the group consisting of a wired pair telephone land line, a cellular telephone link, a PCS link, and an internet protocol (IP) connection.

8. A method as claimed in claim 6 wherein the captioned telephone device and a telephone of the assisted unit are built into a single device.

9. A method of operating a captioned telephone call in which an assisted user is connected by a captioned telephone device which is connected both to one telephone line to a remote user and a second telephone line to a relay providing captioning for a conversation, the method comprising the steps of during a telephone conversation, the captioned telephone device receiving captioning for the words spoken by the remote user from the relay and displaying the words in a visual display for the assisted user; and when the telephone conversation is ended, the captioned telephone device detecting that the telephone conversation is ended and maintaining the telephone connection on the second telephone line to the relay to maintain the set up in case the assisted user intends to promptly make another telephone call.

10. A method as claimed in claim 9 wherein each of the telephone lines is a telephonic connection selected from the group consisting of a twisted pair telephone land line, a cellular telephone link, a PCS link, and an internet protocol (IP) connection.

11. A method of operating a captioned telephone call in which an assisted user is connected by a captioned telephone device which is connected both to one telephone line to a remote user and a second telephone line to a relay providing captioning for a conversation, the method comprising the steps of during a telephone conversation, the captioned telephone device receiving captioning for spoken words of the remote user from the relay and displaying the words in a visual display for the assisted user; and during the telephone conversation, the captioned telephone device using echo cancellation to cancel the voice of the assisted user from the second telephone line so that the relay does not hear the voice of the assisted user, so the relay can caption all the words on the second telephone line without causing confusion to the assisted user.

12. A method as claimed in claim 11 wherein the telephone line is a telephonic connection selected from the group consisting of a twisted pair telephone land line, a cellular telephone link, a POS link, and an internet protocol (IP) socket connection.

13. A method as claimed in claim 11 wherein the captioned telephone device and a telephone of the assisted unit are built into a single device.

* * * * *

UNITED STATES PATENT AND TRADEMARK OFFICE
CERTIFICATE OF CORRECTION

| | | |
|---|---|---|
| PATENT NO. | : 7,660,398 B2 | Page 1 of 1 |
| APPLICATION NO. | : 11/061682 | |
| DATED | : February 9, 2010 | |
| INVENTOR(S) | : Engelke et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Thirtieth Day of November, 2010

David J. Kappos
*Director of the United States Patent and Trademark Office*